United States Patent
Hallander et al.

(10) Patent No.: US 8,662,452 B2
(45) Date of Patent: Mar. 4, 2014

(54) ARTICLE WITH DE-ICING/ANTI-ICING FUNCTION

(75) Inventors: Per Hallander, Linköping (SE); Mikael Petersson, Linköping (SE); Björn Weidmann, Borensberg (SE); Tommy Grankäll, Borensberg (SE); Göte Strindberg, Linköping (SE); Pontus Nordin, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 13/522,343

(22) PCT Filed: Jan. 14, 2010

(86) PCT No.: PCT/SE2010/050029
§ 371 (c)(1),
(2), (4) Date: Jul. 16, 2012

(87) PCT Pub. No.: WO2011/087413
PCT Pub. Date: Jul. 21, 2011

(65) Prior Publication Data
US 2012/0292439 A1    Nov. 22, 2012

(51) Int. Cl.
*B64D 15/12* (2006.01)
(52) U.S. Cl.
USPC .................. 244/134 D; 244/134 R; 219/202
(58) Field of Classification Search
USPC .................. 244/134 D, 134 R; 219/202, 548
See application file for complete search history.

(56) References Cited

U.S. PATENT DOCUMENTS

| | | | | |
|---|---|---|---|---|
| 4,983,814 A | * | 1/1991 | Ohgushi et al. | 219/545 |
| 5,971,323 A | * | 10/1999 | Rauch et al. | 244/134 D |
| 6,137,083 A | | 10/2000 | Bost et al. | |
| 7,281,318 B2 | * | 10/2007 | Marshall et al. | 29/621 |
| 7,291,815 B2 | * | 11/2007 | Hubert et al. | 219/535 |
| 7,391,622 B2 | * | 6/2008 | Marshall et al. | 361/804 |
| 7,763,833 B2 | * | 7/2010 | Hindel et al. | 219/528 |

(Continued)

FOREIGN PATENT DOCUMENTS

| | | |
|---|---|---|
| FR | 2719182 A1 | 10/1995 |
| WO | WO-2007136260 A1 | 11/2007 |

OTHER PUBLICATIONS

PCT/ISA/210—International Serch Report—Sep. 30, 2010.

(Continued)

*Primary Examiner* — Christopher P Ellis
(74) *Attorney, Agent, or Firm* — Venable LLP; Eric J. Franklin

(57) ABSTRACT

A structural article including an outer surface that serves as an aerodynamic surface when the structural article is subjected for an air stream. A resin matrix laminate includes an upper ply and a bottom ply. A heating element is arranged in contact with the bottom ply and coupled to a power supply unit in purpose to deice/anti-ice the outer surface. Each ply includes a thermally conductive filament structure having a filament orientation such that the prolongation of the filaments has an extension essentially perpendicular to the extension of the laminate. The thermally conductive filament structure of the upper ply is embedded in the upper ply in such way that at least a portion of the thermally conductive filament structure is exposed in the outer surface.

9 Claims, 3 Drawing Sheets

(56) References Cited

U.S. PATENT DOCUMENTS

| | | | |
|---|---|---|---|
| 2003/0205642 A1* | 11/2003 | Petrenko et al. | 244/134 D |
| 2005/0189345 A1 | 9/2005 | Brunner et al. | |
| 2006/0219689 A1 | 10/2006 | Huang et al. | |
| 2007/0284366 A1 | 12/2007 | Ohta | |
| 2009/0140098 A1 | 6/2009 | Lengsfeld et al. | |

OTHER PUBLICATIONS

PCT/IPEA/409—International Preliminary Report on Patentability—Dec. 27, 2011.

* cited by examiner

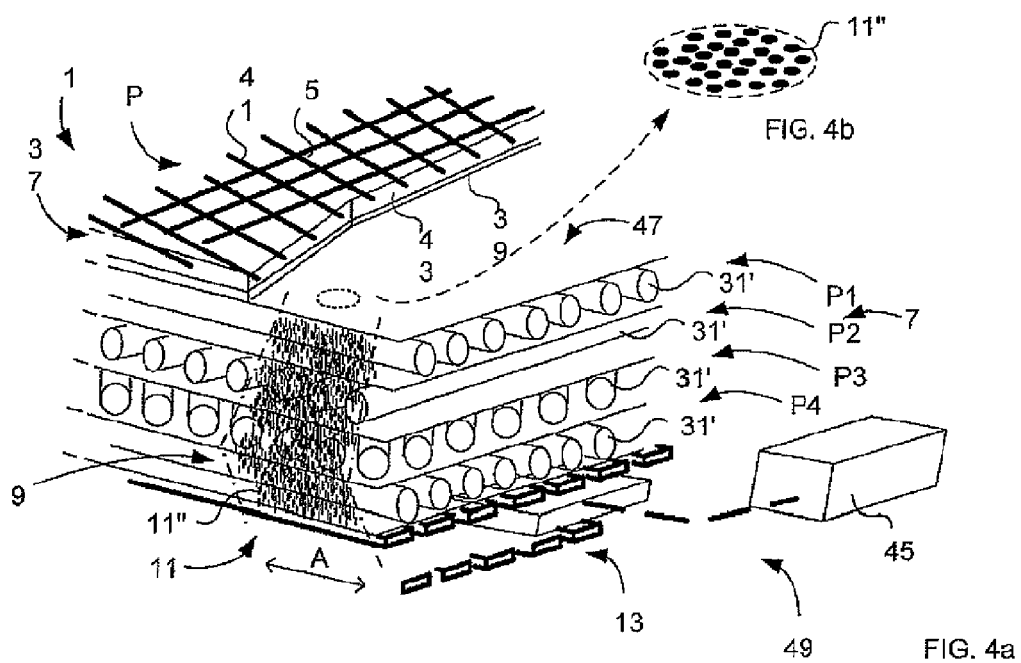
FIG. 4b
FIG. 4a
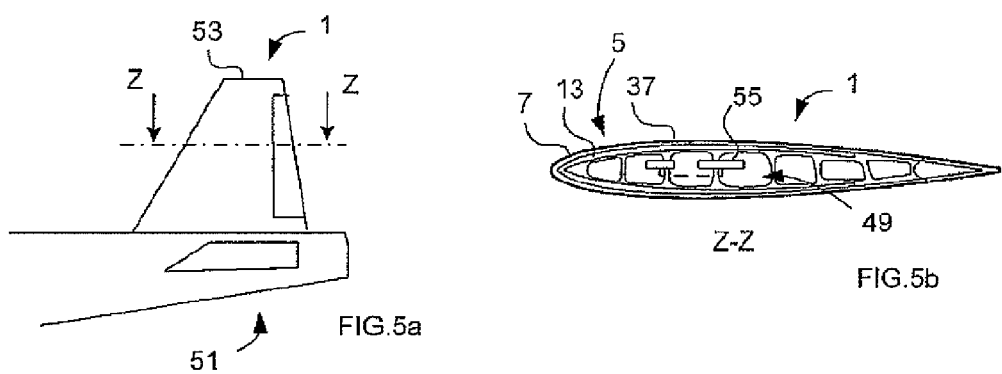
FIG. 5a
FIG. 5b
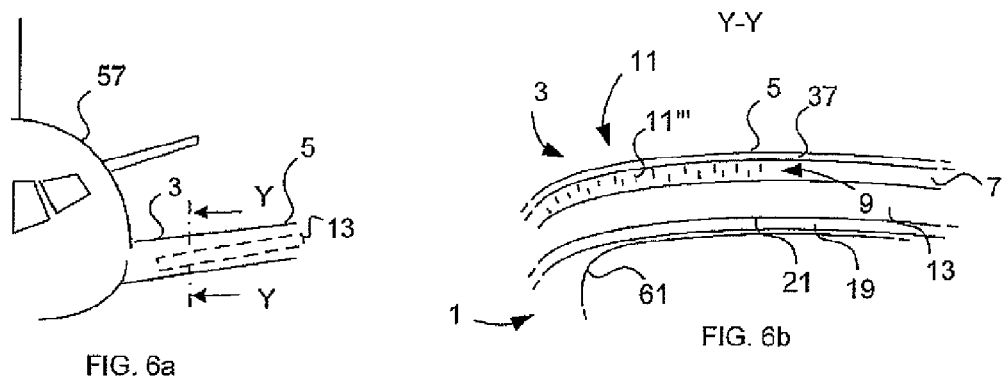
FIG. 6a
FIG. 6b

ARTICLE WITH DE-ICING/ANTI-ICING FUNCTION

Cross-reference to related applications

This application is the national phase under 35 U.S.C. §371 of PCT/SE2010/050029 filed Jan. 14, 2010.

TECHNICAL FIELD

The present invention relates to a structural article with a de-icing/anti-icing function.

The invention primarily regards articles manufactured by aircraft manufacturers. The invention also may regard other article manufacturers, wherein the article is designed with an aerodynamic surface with a heating element for de-icing/anti-icing function.

BACKGROUND ART

Today aerodynamic surfaces of airborne vehicles, such as type wing skins, fin skins, control surfaces, wind turbine blades, open rotor blades etc., having aerodynamic functions, are protected from icing by means of anti-icing/de-icing devices arranged in the aerodynamic surface. Icing is known as an undesired phenomenon, where a build-up of ice is taking place on the aerodynamic surface (outer surface of the article). The aerodynamic surface could also be comprised in engine air intakes, inlet channels etc.

This has been successful for articles with skins made of metal, such as aluminium, as the heating element can be placed under the skin and the heat will be transferred through the metal skin, due to the good conductive property of the metal, and the ice will melt.

Today, however, articles with aerodynamic surfaces are more often made of matrix composite reinforced by for example carbon fibres in the plane of the laminate, but oriented in different directions parallel with the plane of the laminate. The laminate resin has not satisfying thermal conductivity properties and when the heating element is heated for melting the ice on the outer surface of the skin, often the whole skin has to be heated before any ice will be melt. This is thus not beneficial, since the thermal losses provide that the energy consumption will be far too high resulting in a non-economic fuel consumption of the aircraft which also not is environmental-friendly.

The aerodynamic surface is herein defined as the outer (wet) surface of article moving through the air. The article is preferably a component of an airborne vehicle, wherein the article structure comprises a resin matrix made of a lay-up of plies, each ply comprises fibres having an orientation different from the fibre orientation of an adjacent ply, wherein the structural article comprises said outer surface.

US 2005/0189345 discloses strips of composite substrate having resistor elements of electrically-conductive fibres, which elements are arranged under a metal shielding forming the skin surface of the aerodynamic surface.

Today, research and development efforts are present within the aircraft industry to produce more environmental friendly aircrafts. One solution is to develop the aircraft's power plants so that they are more efficient requiring less fuel. Another way is to save weight of the structural parts of the aircraft, whereby the fuel consumption can be reduced.

Nano structures (such as nano fibres/tubes in polymeric materials) are more often used in different applications in aerospace industry in recent years. This is due to the high strength and stiffness of the nano fibres/tubes embedded in the polymeric material, often together with a fibre matrix of carbon or graphite fibres, within the material.

US 2009/0140098 discloses an aircraft component having a resin matrix including carbon nano tubes embedded therein for providing high conductivity of the component in order to defrost the latter.

A purpose of the present invention is thus to provide an matrix composite laminate having a de-icing/anti-icing function, which laminate effective concentrate the thermal heat generated by a heating element of the article in an optimal way reducing thermal losses, thus saving energy of an aircraft's energy supply.

A further purpose is to provide strength to the laminate also in a direction transverse to the extension of the laminate (z-direction).

It is also desirable in an effective manner to provide and maintain the smoothness of the article's outer surface of the laminate during the manufacture of the article. It is also desirable to maintain the smoothness of the outer surface during the service and/or flight of the aircraft. It would thus be beneficial for the aerodynamic efficiency of the article if the outer surface were smooth during the whole service life, thereby promoting a reduced fuel consumption of the aircraft and achieving a cost-effective and environmental friendly transportation of people and goods.

A further object is also to eliminate the eventual drawbacks of known techniques.

SUMMARY OF THE INVENTION

This has been achieved by the airborne vehicle component structure.

In such way is achieved that the thermal conductivity in the transversal direction relative the extension of the plane of the laminate is enhanced, wherein the de-icing/anti-icing heat will be concentrated to the aerodynamic surface (outer surface) at the same time as the strength of the structure will be enhanced by means of the transversally oriented filaments of the conductive filament structure. By concentrating the de-icing/anti-icing heat to the aerodynamic surface, minimal thermal loss will be achieved. Thus is provided an effective and energy saving de-icing/ant-icing function.

Suitably, the thermally conductive filament structure of the upper ply is embedded in the latter in such way that at least a portion of the conductive filament structure is exposed in the outer surface.

This will also promote for a further concentrating of the de-icing/anti-icing heat to the aerodynamic surface, thereby optimizing the efficiency of the de-icing/anti-icing system. Thus is provided an effective and energy saving de-icing/ant-icing function.

By arranging the conductive filament structure also partly exposed in the outer surface of the laminate, which outer surface in some cases corresponds with the aerodynamic surface, a hard surface is also achieved. The hard surface will prevail the smoothness of the outer surface over a long time period (flight hours) reducing the fuel consumption of an aircraft.

Preferably, the thermally conductive filament structure of the bottom ply is embedded in the latter in such way that the filament structure is in contact with the heating element.

Thereby heat effectively will be conducted through the laminate and thereby effective transportation of the heat to the outer surface. This will be the case if the outer surface is comprised of the laminate, but also if the outer surface is comprised of an additional layer applied onto the upper ply. This additional layer can be for example a lightning protection layer electrically isolated from the thermally conductive filament structure. The electrical isolation is provided in such way that that thermal energy still can be conducted to the outer surface of the lightning protection layer in an effective manner.

Suitably, an isolating layer is arranged adjacent the heating element's side facing away from the plies.

In such way is achieved that the heat generated by the heating element further will be concentrated towards the outer surface with less thermal losses. At the same time a fuel tank of an aircraft is protected from heat generated by the heating element.

Preferably, the thermally conductive filament structure is comprised of a thermally conductive nano structure.

Thereby a hard outer surface and an efficient heat transportation transverse the laminate is provided. Also, due to the great number of nano filaments, the conductive properties will be reliable even in case of highly unlikely event that the composite delaminates.

Suitably, the thermally conductive nano structure is comprised of carbon nano fibres.

Thereby a cost-effective production of the article is achieved, since the carbon nano fibres are less costly to produce than CNT's (carbon nano fibres).

Preferably, the thermally conductive nano structure is comprised of carbon nano tubes.

Thereby a well-defined nano structure is achieved for the outer surface having an optimal mechanical strength. The well-defined dimensions of the carbon nano tubes promotes for a nano structure layer which can be as thin as possible.

Suitably, the carbon nano tubes are in shape of forest mats of aligned carbon multi-wall nano tubes.

The CNT (carbon nano tube) can be produced by emerging CNT technology resulting in grown forests of CNT for high efficiency. It is known that CNT can be grown in the shape of "forests" (mats of aligned CNT's) with vertical, tilted or horizontally arranged nano tubes. Combinations of these arrangements are also possible, e.g. as two or more separate layers stacked on top of each other. It is also possible to grow CNT's as well-defined patterns, suited for the intended application. The term CNT in this application includes all types of carbon nano tubes. These can be single-wall, double-wall or multi-wall nano tubes. In addition, CNT-like materials like graphene, graphone and similar carbon-based materials with suitable electrical properties can be used. This includes single or multiple layers arranged in the plane of the outer surface or placed at a suitable angle to this plane. CNT's and similar materials as described above have a very good electrical conductivity and are therefore very suited for the lightning protection function of the article.

Preferably, the nano filament (CNT, nano fibre, nano multi wall filament, nano double wall filament, nano wire etc.) has a length of 0.125 mm or less. This is suitable for a common pre-preg ply having a thickness of 0.125 mm used in the production of aircrafts. If leaning, or in the plane oriented nano filaments are used, the length preferably can be longer. The definition of nano means that a filament particle has at least one dimension not more than 200 nm. 1 nm (nanometer) is defined as $10^{-9}$ meter (0.000 000 001 meter). Preferably, the diameter of a multiwall nano tube is 15-35 nm, suitably 18-22 nm. Suitably, the diameter of a single wall nano tube is 1.2-1.7 nm, preferably 1.35-1.45 nm.

Preferably, the article comprises a lightning protective layer adhered to the upper ply via an isolating layer.

Thereby the de-icing/anti-icing system is protected from an eventual lightning strike. The lightning protective layer is electrically isolated from the thermally conductive nano structure. The electrical isolation is provided in such way that that thermal energy still can be conducted to the outer surface of the lightning protective layer in an effective manner.

Suitably, the article is an aircraft wing shell.

Thereby an aircraft is achieved which is environmental friendly in regard to lower power consumption for the de-icing/anti-icing function.

BRIEF DESCRIPTION OF THE DRAWINGS

The present invention will now be described by way of examples with references to the accompanying schematic drawings, of which:

FIGS. 4a-4b illustrate an enlarged portion in a perspective view of the structural article adapted for a wing shell according to a fourth embodiment;

FIGS. 5a-5b illustrate a fin of an aircraft comprising a structural article according to the fourth embodiment; and FIGS. 6a-6b illustrate a wing comprising a structural article according to a fifth embodiment.

DETAILED DESCRIPTION

Hereinafter, embodiments of the present invention will be described in detail with reference to the accompanying drawings, wherein for the sake of clarity and understanding of the invention some details of no importance are deleted from the drawings.

Also, the illustrative drawings show nano structures of different types, being illustrated extremely exaggerated and schematically for the understanding of the invention. The conductive nano structures are illustrated exaggerated in the figures also for the sake of understanding of the orientation and the alignment of the conductive nano filaments. The thermally conductive filament structures are also only partly illustrated in the figures for the sake of clarity.

Figure 1:
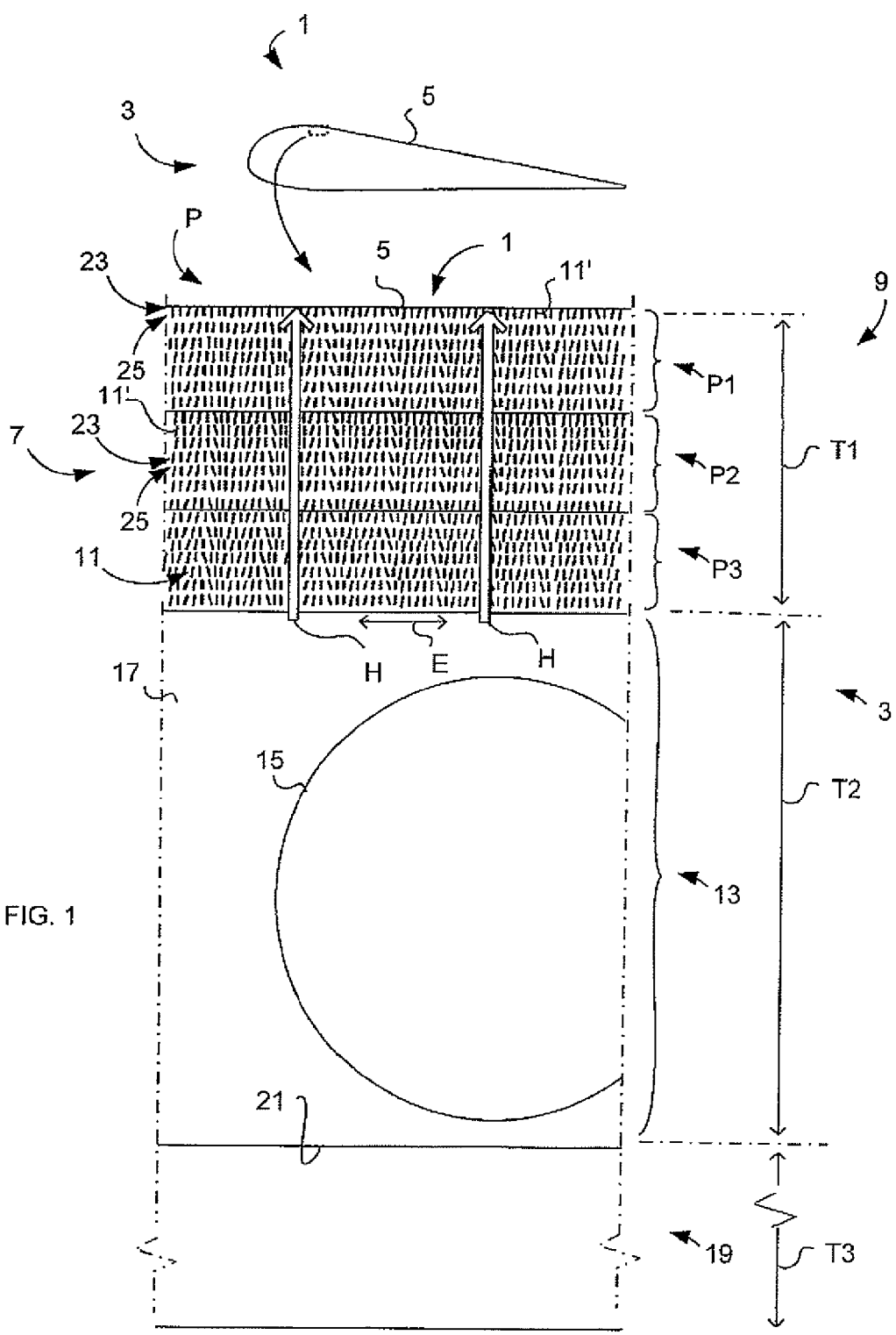
FIG. 1 illustrates a cross-section of a resin matrix composite shell of a structural article according to a first embodiment.

FIG. 1 schematically illustrates a cross-section of a resin matrix composite of a structural article 1 according to first embodiment. The structural article 1, here in the form of a wing shell 3, comprises an outer surface 5, which serves as an aerodynamic surface when the structural article 1 is subjected for an air stream. The structural article 1 further comprises a resin matrix laminate 7 including an upper ply P1, an intermediate ply P2 and a bottom ply P3. Each ply P1, P2, P3 comprises a thermally conductive filament structure 9 having a filament orientation such that the prolongation of the filaments 11 (thermally conductive carbon nano tubes 11') has an extension essentially perpendicular to the extension E of the laminate 7. The thermally conductive nano structure 9 is thus comprised of the thermally conductive carbon nano tubes 11'. A heating element 13 is arranged in contact with the bottom ply P3 and coupled to a power supply unit (not shown) in purpose to de-ice/anti-ice the outer surface 5 via the conductive carbon nano tubes 11'. The heating element 13 is made of bronze strips 15 being embedded in a conductive substrate 17 arranged to generate heat when subjected for a current fed by the power supply unit.

An isolating layer 19 is arranged adjacent the heating element's 13 side 21 facing away from the plies P1, P2, P3. In such way is achieved that the heat generated by the heating element 13 further will be concentrated towards the outer surface 5 with less thermal losses.

The thermally conductive carbon nano tubes 11' of the upper ply P1 are embedded in the latter in such way that at least a portion of the thermally conductive carbon nano tubes 11' is exposed in the outer surface 5. The thermally conductive filament structure's 9 thermally conductive carbon nano tubes 11' are each comprised of a first 23 and a second end 25. The thermally conductive filament structure 9 is thus partly exposed in the outer surface 5 such that a part of the thermally conductive filament structure 9 comprising the first ends 23 is exposed in the outer surface 5 (which first ends 23 are exposed in the outer surface 5).

In such way is achieved that the thermal conductivity in the transversal direction relative the extension E of the plane P of the laminate 7 is enhanced, wherein the de-icing/anti-icing heat (marked with H) generated by the heating elements 13 will be concentrated to the aerodynamic surface (outer surface 5) at the same time as the strength of the structural article 1 will be enhanced by means of the transversally oriented thermally conductive carbon nano tubes 11'. By concentrating the de-icing/anti-icing heat to the aerodynamic surface, minimal thermal loss will be achieved. Thus is provided an effective and energy saving de-icing/ant-icing function. By the adaption of thermally conductive carbon nano tubes 11', a well-defined nano filament structure is achieved for the outer surface 5 having an optimal mechanical strength. The well-defined dimensions of the thermally conductive carbon nano tubes 11' promotes for that the three plies P1, P2, P3 can be as thin as possible maintaining the strength and at the same time saving weight of the structural article 1 which improves the efficiency of an aircraft.

By arranging the thermally conductive filament structure 9 also partly exposed in the outer surface 5 of the laminate 7, which outer surface 5 corresponds with the aerodynamic surface, a hard surface is also achieved. The hard surface will prevail the smoothness of the outer surface 5 over a long time period (flight hours) reducing the fuel consumption of an aircraft. During the handling of laminates of personnel during production, the hard outer surface 5 will also prevent scratches of the outer surface 5, which otherwise would affect the aerodynamic properties.

The hard outer surface and the efficient heat transportation transverse the laminate of the structural article 1 has thus been provided. Also, due to the great number of thermally conductive nano tubes 11', the conductive properties will be reliable even in case of highly unlikely event that the composite of the laminate 7 delaminates.

The thickness T1 in this embodiment is for each ply P1, P2, P3 is 0.22-0.28 mm, preferably 0.18-0.30 mm. The thickness T2 of the heating element 13 is 1.8-2.2 mm, preferably 1.5-2.5 mm. The thickness T3 of the isolating layer 19 is 2.8-3.2 mm, preferably 2.5-3.5 mm.

Figure 2:
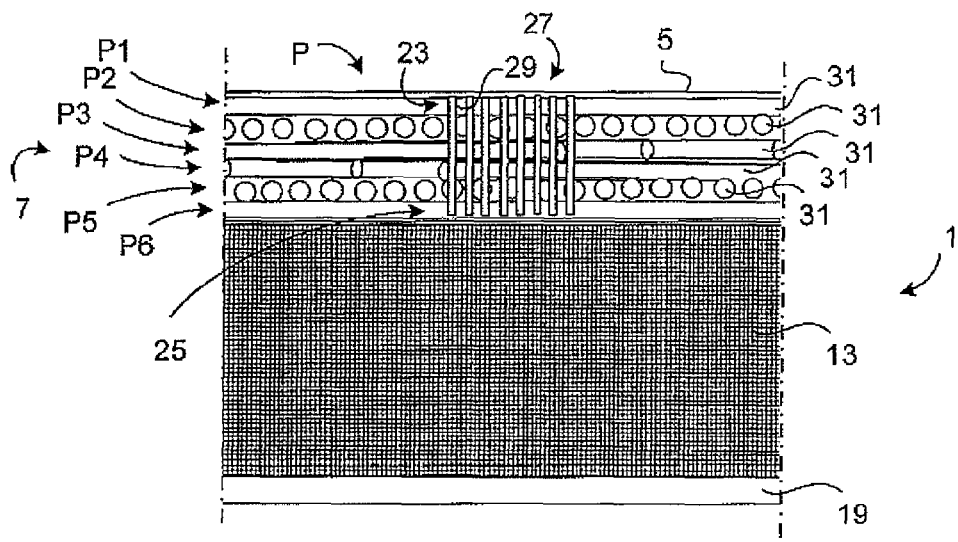
FIG. 2 illustrates a cross-section of a fibre reinforced composite resin matrix according to a second embodiment.

FIG. 2 schematically illustrates a cross-section of a fibre reinforced composite resin matrix of a structural article 1 according a second embodiment This embodiment also concerns a structural article 1 comprising an outer surface 5, which serves as an aerodynamic surface when the structural article 1 is subjected for an air stream. The structural article 1 comprises a resin matrix laminate 7, which includes six plies P1, P2, P3, P4, P5, P6. A heating element 13 is arranged in contact with the bottom ply P6 and is coupled to a power supply unit (not shown) in purpose to de-ice/anti-ice the outer surface 5.

Through the plies P1, P2, P3, P4, P5, P6 are thermally conductive carbon fibres 27 transversally driven by means of head mechanisms (not shown). During the production of the structural article the Z-pins are driven into the laminate 7 using pressure and high frequency. These transversally oriented carbon fibres are also called Z-pins 29, wherein the carbon fibres (Z-pins 29) have an orientation such that the prolongation of the Z-pins 29 has an extension essentially perpendicular to the extension of the laminate's 7 plane P. The Z-pins 29 comprises a first end 23 and a second end 25. The first ends 23 are situated near the outer surface 5 and the second ends 25 are situated near the heating element 13.

Furthermore, each ply P1, P2, P3, P4, P5, P6 comprises carbon fibres (here defined as horizontal fibres 31 or larger fibres) arranged with an orientation parallel with the extension of the laminate's 7 plane P for strengthening the laminate 7 in a direction corresponding with the extension of the laminate's 7 plane P. However, the orientation of the horizontal fibres 31 in one ply P1 is different from the orientation of the horizontal fibres (the diameter of these large fibres is approximately 6-8 micro meters) of an adjacent ply P2 for further strengthening of the laminate 7 in said plane P.

The conductive Z-pins 29 are strengthening the laminate 7 in a transversal direction relative said plane P and promote at the same time for a concentration of heat through the laminate 7 from the heating element 13 to the outer surface 5.

The heating element 13 generates heat which will be conducted via the Z-pins 29 towards the outer surface, when detection of ice is made by means of detection sensors (not shown) or when risk for formation of ice is due.

Figure 3:
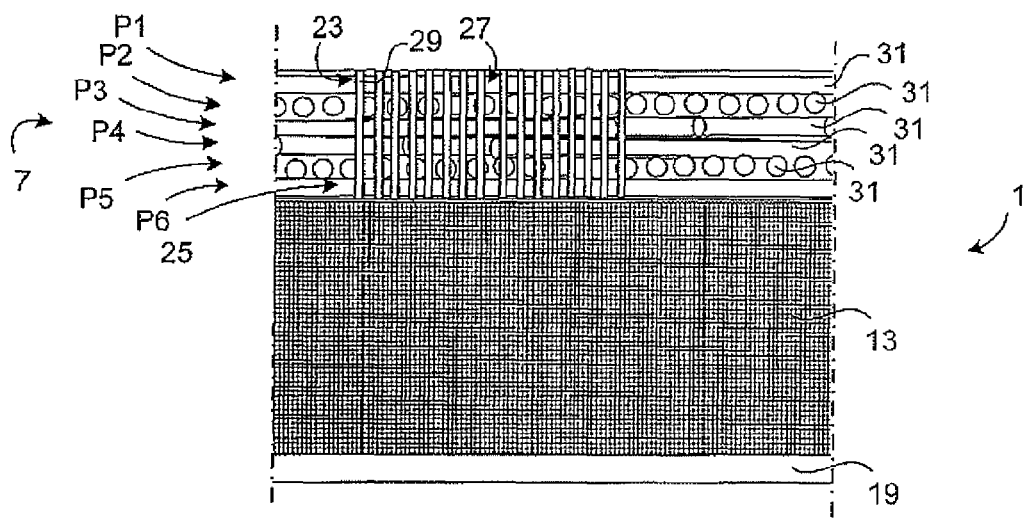
FIG. 3 illustrates a cross-section of a fibre reinforced composite resin matrix according to a third embodiment.

FIG. 3 schematically illustrates a cross-section of a fibre reinforced composite resin matrix of a structural article 1 according a third embodiment.

The third embodiment of FIG. 3 corresponds almost with the second embodiment, but with the difference that the second ends 25 of graphone Z-pins 29, positioned in the bottom ply P6, are embedded in the latter in such way that the Z-pins 29 are in contact with the heating element 13. The first ends 23 of the graphone Z-pins 29 are exposed in the outer surface 5.

Thereby heat effectively will be conducted through the laminate whereby the Z-pins 29 promote for an effective transportation of the heat to the outer surface 5. A further effect of the Z-pinning is an increase of the strength and stiffness of the laminate 7 and prevents (but highly unlikely) a potential delamination between the plies.

FIG. 4a schematically illustrates an enlarged portion of a structural article 1 adapted for a wing shell according to a fourth embodiment. The structural article 1 comprises a resin matrix laminate 7 including four plies P1, P2, P3, P4; an upper ply P1, a second ply P2, a third ply P3 and a bottom ply P4. The structural article 1 also comprises an outer surface 5, which serves as an aerodynamic surface when the structural article 1 is subjected for an air stream. A lightning protective layer 37 is adhered to the upper ply P1 via an insulating layer 39. The outer surface 5 thus in this embodiment being comprised in the lightning protective layer 37 composed of a bronze net 41 embedded in a resin layer 43. Each ply P1, P2, P3, P4 comprises ceramic fibres 31' having an extension parallel with the plane P of the laminate 7, but with different orientations in said plane P. Each ply P1, P2, P3, P4 comprising the ceramic fibres 31' (horizontal fibres 31') arranged with an orientation parallel with the extension of the laminate's 7 plane P promotes for strengthening of the laminate 7 in a direction corresponding with the extension of the laminate's 7 plane P.

Each ply P1, P2, P3, P4 comprises a thermally conductive filament structure 9 having a filament orientation such that the prolongation of the filaments 11 has an extension perpendicular to the extension of the laminate 7. The thermally conductive filament structure 9 is comprised of a thermally conductive nano structure in the form of forest mats of aligned carbon nano multi-wall tubes 11" (only a portion A is shown for the sake of illustration). Thereby an efficient heat transportation transverse the laminate 7 is provided from a heating element 13. The heating element 13 is arranged in contact with the bottom ply P4 and with the thermally conductive nano filament structure 9 comprising the aligned carbon nano multi-wall tubes 11". The heating element 13 is further connected to a power supply unit 45 in purpose to de-ice/anti-ice the outer surface 5 via the thermally conductive nano filament structure 9.

The laminate's 7 side 47 facing towards the lightning protective layer 37 has exposed thermally conductive carbon multi-wall nano tubes 11" (exaggerated view from above in FIG. 4b) promoting for a further concentrating of the de-icing/anti-icing heat to the aerodynamic surface (outer surface 5) of the structural article 1, thereby optimizing the efficiency of the de-icing/anti-icing system 49. Thus is provided an effective and energy saving de-icing/ant-icing function, which also is protected from eventual lightning strike. The lightning protective layer 37 is electrically isolated from the thermally conductive nano structure 9. The electrical isolation is provided in such way that that thermal energy still can be conducted to the outer surface 5 of the lightning protection layer 37 in an effective manner. Multi-wall nano tubes are more cost-effective to produce than for example double and single nano tubes.

FIG. 5a schematically illustrates an aircraft tail 51 and a fin 53 comprising a structural article 1 according to the fourth embodiment described above. Electrical components 55, shown in FIG. 5b, being arranged in the fin 53 are sensitive for eventual lightning strike flash-over and the lightning protective layer 37 protects the structural article's 1 electrical components and also the de-icing/anti-icing system 49 of the aircraft. FIG. 5b is a cross-sectional view of the fin 53 illustrated in FIG. 5a and shows the electrical components of the de-icing/anti-icing system 49.

FIGS. 6a schematically illustrates an aircraft 57 from the front. A portion of the cross-section of the aircraft's 57 wing shell 3 taken in FIG. 6a is shown in FIG. 6b. The wing shell 3 is comprised of a structural article 1 according to a fifth embodiment. This embodiment also regards the purpose to concentrate the heat to the outer surface 5, which serves as an aerodynamic surface when the structural article 1 is subjected for an air stream. The structural article 1 comprises a resin matrix laminate 7 including several plies including an upper ply (not shown). A heating element 13 is arranged in contact with the bottom ply and is coupled to a power supply unit (not shown) in purpose to de-ice/anti-ice the outer surface 5. The outer surface 5 is part of a lightning protective layer 37 co-cured with the laminate 7.

Each ply beneath the lightning protective layer 37 comprises a thermally conductive filament structure 9 having a filament orientation such that the prolongation of the filaments 11 has an extension essentially perpendicular to the extension of the laminate 7, wherein the thermally conductive filament structure 9 is comprised of a thermally conductive nano structure including carbon nano fibres 11'''.

An isolating layer 19 is arranged adjacent the heating element's 13 side 21 facing away from the plies of the laminate 7. The isolating layer 19 is in this way arranged between the heating element 13 and the aircraft's left wing tank 61. Thereby is achieved that the heat generated by the heating element 13 further will be concentrated towards the outer surface 5 with less thermal losses. At the same time the left wing tank 61 will be protected from heat generated by the heating element 13.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims.

The thermally conductive nano structure filaments can be embedded in the upper ply in such way that a portion of the nano filaments is exposed in the outer surface. This means that a portion of the nano structure is exposed in the outer surface, meaning that the filaments' first ends of that portion are exposed. Thereby an energy saving de-icing/anti-icing function is provided.

A typical composite component such as a wing skin or an integrated wing leading edge of CFRP or similar material could, as an example, be cured in a female tool. The plies (precured or uncured) can be placed in this tool before the curing operation to form the outer layer of the cured assembly. The CNT (carbon nano tube)-reinforced surface layer of the laminate can be integrated in the lay-up and curing of the composite airframe article. The plies can be separately manufactured and attached to the composite structural article after curing.

This application includes all types of nano filaments, such as nano wires, carbon nano tubes, nano fibres etc. The CNT can be single-wall, double-wall or multi-wall nano tubes. In addition, CNT-like materials like graphene, graphone and similar carbon-based materials with suitable thermal properties can be used. The composite of the plies can be epoxy, polymides, bismaleimides, phenolics, cyanatester, PEEK, PPS, polyester, vinylester and other curable resins or mixtures thereof. If used, the "horizontal" reinforcing fibre structure may be of ceramic, carbon and metal or mixtures thereof.

The invention claimed is:

1. A structural article, comprising:
   an outer surface, which serves as an aerodynamic surface when the structural article is subjected for an air stream,
   a resin matrix laminate including an upper ply and a bottom ply,
   a heating element is arranged in contact with the bottom ply and coupled to a power supply unit in purpose to deice/anti-ice the outer surface,
   wherein each ply comprises a thermally conductive filament structure having a filament orientation such that the prolongation of the filaments has an extension essentially perpendicular to the extension of the laminate, wherein the thermally conductive filament structure of the upper ply is embedded in the upper ply such that at least a portion of the thermally conductive filament structure is exposed in the outer surface.

2. The article according to claim 1, wherein the thermally conductive filament structure of the bottom ply is embedded in the latter in such way that the thermally conductive filament structure is in contact with the heating element.

3. The article according to claim 1, wherein an isolating layer is arranged adjacent a side of the heating element facing away from the plies.

4. The article according to claim 1, wherein the thermally conductive filament structure comprises a thermally conductive nano structure.

5. The article according to claim 4, wherein the thermally conductive nano structure comprises carbon nano fibers.

6. The article according to claim 4, wherein the thermally conductive nano structure comprises carbon nano tubes.

7. The article according to claim 6, wherein the carbon nano tubes are in a shape of forest mats of aligned carbon multi-wall nano tubes.

8. The article according to any of the preceding claims, wherein the article comprises claim 1, further comprising:
a lightning protective layer adhered to the upper ply via an insulating layer.

9. The article according to claim 1, wherein the article is an aircraft wing shell.

* * * * *